United States Patent
Nakajima et al.

(10) Patent No.: US 12,075,801 B2
(45) Date of Patent: *Sep. 3, 2024

(54) SOLID COMPOSITION HAVING FLORAL SCENT

(71) Applicant: SUNTORY HOLDINGS LIMITED, Osaka (JP)

(72) Inventors: Takeshi Nakajima, Kyoto (JP); Keita Kikuchi, Kyoto (JP); Daisaku Yonezawa, Kanagawa (JP); Yuji Hirayama, Kanagawa (JP); Taisuke Osanai, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/762,515

(22) PCT Filed: Sep. 25, 2020

(86) PCT No.: PCT/JP2020/036268
§ 371 (c)(1),
(2) Date: Mar. 22, 2022

(87) PCT Pub. No.: WO2021/065716
PCT Pub. Date: Apr. 8, 2021

(65) Prior Publication Data
US 2022/0330579 A1    Oct. 20, 2022

(30) Foreign Application Priority Data

Sep. 30, 2019 (JP) .................................. 2019-180688

(51) Int. Cl.
*A23L 2/395* (2006.01)
*A23F 3/32* (2006.01)
*A23L 2/56* (2006.01)
*A23L 27/20* (2016.01)

(52) U.S. Cl.
CPC ............... *A23L 2/395* (2013.01); *A23F 3/32* (2013.01); *A23L 2/56* (2013.01); *A23L 27/20* (2016.08)

(58) Field of Classification Search
CPC ... A23F 3/32; A23L 2/56; A23L 2/395; A23L 27/20
See application file for complete search history.

(56) References Cited

U.S. PATENT DOCUMENTS

| | | |
|---|---|---|
| 3,966,986 A | 6/1976 | Hunter et al. |
| 4,265,923 A | 5/1981 | Sprecher et al. |
| 4,474,822 A | 10/1984 | Sato et al. |
| 2009/0029003 A1 | 1/2009 | Bagaria et al. |
| 2010/0209585 A1 | 8/2010 | Fukuda et al. |
| 2013/0156929 A1 | 6/2013 | Sasame et al. |
| 2022/0330579 A1 | 10/2022 | Nakajima et al. |

FOREIGN PATENT DOCUMENTS

| | | |
|---|---|---|
| EP | 3949746 A1 | 2/2022 |
| GB | 1306017 A | 2/1973 |
| GB | 2074838 | * 11/1981 |
| JP | S57-33545 A | 2/1982 |
| JP | S63-024851 A | 2/1988 |
| JP | H05-304890 A | 11/1993 |
| JP | H09-118626 A | 5/1997 |
| JP | 2005-143467 A | 6/2005 |
| JP | 2006-75112 A | 3/2006 |
| JP | 2007-289115 A | 11/2007 |
| JP | 2009-508477 A | 3/2009 |
| JP | 2009-72188 A | 4/2009 |
| JP | 2009-219481 A | 10/2009 |
| JP | 2010-233559 A | 10/2010 |
| JP | 2013-153739 A | 8/2013 |
| JP | 2013-226111 A | 11/2013 |
| JP | 2016-55 A | 1/2016 |
| JP | 2016-15924 A | 2/2016 |
| KR | 20180081970 A | 7/2018 |
| SG | 121100 A1 | 4/2006 |
| WO | 2011/126005 A1 | 10/2011 |
| WO | 2012/029132 A1 | 3/2012 |

OTHER PUBLICATIONS

Jeon, Dong-Bok et al., "Determination of volatile organic compounds, catechins, caffeine and theanine in Jukro tea at three growth stages by chromatographic and spectrometric methods", Food Chemistry, 2017, vol. 219, pp. 443-452; (10 pages).
Owuor, P. Okinda et al., "Effects of fermentation under Enriched Oxygen Atmosphere on Clonal Black Tea Aroma Complex", Food Sci. Technol. Int. Tokyo, 1998, vol. 4, No. 2, pp. 136-139; (4 pages).
Owuor, Philip O. et al., "Effects of storage time in a two-stage withering process on the quality of seedling black tea", Food Chemistry, 1992, vol. 45, pp. 45-49; (5 pages).
International Search Report dated Nov. 17, 2020, issued in counterpart Application No. PCT/JP2020/036268. (3 pages).
English Translation of International Search Report dated Jun. 23, 2020, issued in counterpart Application No. PCT/JP2020/013891. (2 pages)(issued in Counterpart to U.S. Appl. No. 17/599,246).
Xu Yong-Quan et al: "Improving the quality of fermented black tea juice with oolong tea infusion", Journal of Food Science and Technology, Springer (India) Private Ltd, India, vol. 54, No. 12, Sep. 13, 2017 (Sep. 13, 2017), pp. 3908-3916, XP036341405; Cited in Extended European Search Report dated Nov. 24, 2022. (9 pages)(issued in Counterpart to U.S. Appl. No. 17/599,246).

(Continued)

*Primary Examiner* — Anthony J Weier

(74) *Attorney, Agent, or Firm* — WHDA, LLP

(57) ABSTRACT

An object of the present invention is to provide a solid composition that provides floral aroma when added to a medium such as water. The solid composition comprises linalool, geraniol, and 2-methylbutanal, and has a weight ratio of 2-methylbutanal content to total linalool and geraniol content which is adjusted to be in the range of from 0.015 to 0.215.

8 Claims, No Drawings

(56) References Cited

OTHER PUBLICATIONS

Christian Schuh et al: "Characterization of the Key Aroma Compounds in the Beverage Prepared from Darjeeling Black Tea: Quantitative Differences between Tea Leaves and Infusion", Journal of Agricultural and Food Chemistry, vol. 54, No. 3, Feb. 1, 2006 (Feb. 1, 2006), pp. 916-924, XP055364876; Cited in Extended European Search Report dated Nov. 24, 2022. (9 pages)(issued in Counterpart to U.S. Appl. No. 17/599,246).
The Extended European Search Report dated Nov. 24, 2022, issued in counterpart EP application No. 20785417.5. (10 pages)(issued in Counterpart to U.S. Appl. No. 17/599,246).
Office Action dated Jun. 26, 2023, issued in counterpart SG application No. 11202110278P. (10 pages). (issued in Counterpart to U.S. Appl. No. 17/599,246).
Kang, S. et al, "Multivariate Statistical Analysis of Volatiles Compounds in Green Teas from Different Harvesting Seasons", 2018, Food Science, vol. 39, No. 14, pp. 268-275, cited in SG Office Action dated Jun. 26, 2023. (8 pages). (issued in Counterpart to U.S. Appl. No. 17/599,246).
Ismail et al., "Comparative study on volatile compunds in Turkish green tea powder: Impact of tea clone, shading level and shooting period", Food Research Intl., 2012, vol. 53, No. 2, pp. 744-750, cited in EP Extended European Search Report dated Sep. 4, 2023.
Extended (Supplementary) European Search Report dated Sep. 4, 2023, issued in counterpart EP application No. 20871509.4. (11 pages).
Non-Final Office Action dated May 17, 2023, issued in U.S. Appl. No. 17/599,246. (18 pages).(issued in Counterpart to U.S. Appl. No. 17/599,246).
Ma L. et al., Analysis of Aroma Components of Green Teas Made from Leaves of High-Quality Tea Strains in Hubei Province, Food Science, vol. 40, No. 10, p. 251-256, May 25, 2019, with partial English translation. (10 pages); cited in CN Office Actoin dated Dec. 28, 2023.
Yang C. et al., Analysis of Aroma Characteristics and Defferences of 5 Types of Jiu'an Ancient Tree Black Tea, Jiangsu Agricultural Science, vol. 44, No. 7, p. 324-327, Aug. 12, 2016, with patial English translation. (8 pages); cited in CN Office Actoin dated Dec. 28, 2023.
Office Action dated Feb. 9, 2024, issued in counterpart SG Application No. 11202202560T. (9 pages).
Lee, J. et al., Volatie Aroma Compounds in Various Brewed Green Teas, Molecules, vol. 18, pp. 10024-10041, 2013; cited in SG Office Action dated Jul. 9, 2024. (19 pages).
Han, Z., Data on green tea flavor determinates as affected by cultivars and maunfacturing processes, Data in Brief, Elsevier, vol. 10, pp. 492-498, 2017; cited in SG Office Action dated Jul. 9, 2024. (7 pages).
Office Action dated Jul. 9, 2024, issued in counterpart SG Application No. 11202110278P. (8 pages).

\* cited by examiner

SOLID COMPOSITION HAVING FLORAL SCENT

TECHNICAL FIELD

The present invention relates to a solid composition, and more particularly to a solid composition that provides floral aroma.

BACKGROUND ART

Tea beverages produced from processed tea leaves are widely consumed not only in Japan but also in other countries throughout the world. Some tea beverages are sold in the form of packaged beverages which are beverages sterile packed in packages such as PET bottles or cans, or other tea beverages are sold in the form of tea powders which are made by drying and powdering tea into a powdery form and are intended to be consumed while dissolved in cold or hot water, or the like. Powdery teas that are to be drunk with water or hot water are broadly classified into the following two forms: one being instant teas obtained by drying a liquid tea leaf extract, and the other being powdered teas obtained by pulverizing tea leaves as they are.

With regard to instant teas, various techniques intended to improve tea flavor have been disclosed. For example, the following instant teas have been disclosed: an instant tea obtained by performing extraction of the same tea leaves multiple times repeatedly during the process of preparing a liquid tea leaf extract (PTL 1); and an instant tea characterized in that a caffeine content is reduced by purifying a green tea extract with a mixed solution comprising ethanol and water at a specified ratio (PTL 2). Also disclosed is an instant tea prepared using a monosaccharide or disaccharide such as glucose or maltose for the purpose of preventing a loss of flavor over time (PTL 3). With regard to powdered teas, various techniques intended to improve dispersity or solubility in water have been disclosed—for example: a powdered tea obtained by dispersing a pulverized product of tea leaves in a liquid vegetable extract and then spray-drying the obtained dispersion (PTL 4); and a powdered tea mainly composed of pulverized tea leaves obtained by pulverizing and atomizing tea leaves in an aqueous solution (PTL 5).

CITATION LIST

Patent Literatures

PTL 1: Japanese Unexamined Patent Application Publication No. JP 2013-226111
PTL 2: Japanese Unexamined Patent Application Publication No. JP 2009-72188
PTL 3: Japanese Unexamined Patent Application Publication No. JP 2013-153739
PTL 4: Japanese Unexamined Patent Application Publication No. JP 2010-233559
PTL 5: Japanese Unexamined Patent Application Publication No. JP 2007-289115

SUMMARY OF INVENTION

Technical Problem

Tea beverages, inter alia high-grade green tea beverages, have characteristic aromas—one of those characteristic aromas is called "floral aroma". While various types of solid tea compositions have been developed and sold, there has been no known solid tea composition that provides excellent aroma, in particular excellent floral aroma. Therefore, an object of the present invention is to provide a solid composition that provides floral aroma when added to a medium such as water.

Solution to Problem

The present inventors have made intensive studies to achieve the aforementioned object, and as a result found that while it has conventionally been believed that linalool and geraniol have the most significant effect on the floral aroma of tea, further incorporating 2-methylbutanal in combination with these two components enables production of excellent floral aroma more characteristic of high-grade tea leaves. Further, the inventors found that more excellent floral aroma can be produced by adjusting the ratio of 2-methylbutanal content to total linalool and geraniol content to be within a specified range. Based on these findings, the inventors have completed the present invention.

The present invention is directed, but not limited, to the following.

(1) A solid composition comprising linalool, geraniol, and 2-methylbutanal, and having a weight ratio of 2-methylbutanal content to total linalool and geraniol content of from 0.015 to 0.215.
(2) The composition as set forth in (1), wherein the composition is a powder composition.
(3) The composition as set forth in (1) or (2), comprising two or more types of dextrins.
(4) The composition as set forth in (3), comprising a linear dextrin and a cyclic dextrin.
(5) The composition as set forth in any of (1) to (4), further comprising at least one aroma component selected from the group consisting of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole.
(6) The composition as set forth in any of (1) to (5), comprising a tea leaf extract.
(7) The composition as set forth in any of (1) to (6), wherein the tea leaf extract is a Sencha tea leaf extract.
(8) A beverage or food comprising the composition as set forth in any one of (1) to (7).
(9) The beverage or food as set forth in (8), wherein the beverage or food is a beverage.
(10) The beverage or food as set forth in (9), wherein the beverage or food is a tea beverage.

Advantageous Effects of Invention

According to the present invention, a solid composition that provides floral aroma when added to a medium such as water can be provided. The solid composition of this invention can be made with water or hot water into a tea beverage, and the thus-obtained tea beverage can provide floral aroma characteristic of high-grade tea at the time of drinking. The solid composition of this invention is extremely lighter in weight than tea beverages and thus is excellent in convenience during transportation.

Also, the solid composition of the present invention can be used as a source material to make foods. In recent years, there has been a tendency toward an increase in the number and types of tea flavored foods. By using the solid composition of this invention, excellent floral aroma can be imparted to, for example, confectionary foods, such as cakes, sponge cakes, candies, cookies, jellies, puddings and chocolates.

DESCRIPTION OF EMBODIMENTS

Hereunder, the solid composition of the present invention will be described. Unless otherwise specified, the terms "ppm", "ppb" and "wt. %" as used herein refer respectively to ppm, ppb, and wt. % on a weight/weight (w/w) basis.

One embodiment of the present invention is directed to a solid composition comprising linalool, geraniol and 2-methylbutanal, and having a weight ratio of 2-methylbutanal content to total linalool and geraniol content of from 0.015 to 0.215. By adopting the aforementioned composition profile, the solid composition can exhibit excellent floral aroma. As referred to herein, the term "floral aroma" refers to an aroma that combines a refreshing aroma like lily of the valley with a rose-like sweet scent.

(Tea Leaf Extract)

The solid composition of the present invention can comprise a tea leaf extract. As referred to herein, the term "tea leaf extract" refers to components extracted from tea leaves. The tea leaves that can be used in the present invention are leaves obtained from plants belonging to the family Theaceae, genus *Camelia* (e.g., *Camellia sinensis* (L) O. Kuntze). The tea leaves used in this invention can be classified into non-fermented tea leaves, semi-fermented tea leaves, and fermented tea leaves depending on the method of processing. Examples of non-fermented tea leaves include, but are not limited to, green tea leaves, such as Aracha (crude tea), Sencha (brewed green tea), Gyokuro (refined green tea), Kabuse-cha (shaded green tea), Tencha (non-ground tea leaves used for Matcha), Bancha (coarse green tea), Houji-cha (roasted green tea), Kamairi-cha (pot-roasted green tea), Kukicha (twig tea), Bocha (roasted twig tea), and Media (bud tea). Examples of semi-fermented tea leaves include, but are not limited to, oolong tea leaves, such as Tieguanyin (Tekkanon), Sezhong (Shikishu), Huangjin Gui (Ougonkei), and Wuyi tea (Buigan tea). Examples of fermented tea leaves include, but are not limited to, black tea leaves, such as Darjeeling, Assam, and Sri Lanka. In this invention, one type of tea leaves may be used alone, or two or more types of tea leaves may be used in a blended form. Any parts of plants, such as leaves and stems, can be used, as appropriate, to make tea without particular limitation as long as they are plant parts from which fragrance components can be extracted. Tea leaves can be used in any shapes, without limitation, such as whole or powdered leaf. The tea leaf extract used in this invention is not particularly limited, but a green tea leaf extract is preferably used, with a Sencha tea leaf extract being more preferably used.

The content of a tea leaf extract in the solid composition of the present invention is not particularly limited, and is in the range of, for example, from 30 to 90 wt. %, preferably from 35 to 80 wt. %, more preferably from 40 to 70 wt. %. When the content of a tea leaf extract falls within the aforementioned range, the aroma derived from tea leaves can be fully felt.

(Linalool, Geraniol and 2-Methylbutanal)

The solid composition of the present invention comprises linalool, geraniol, and 2-methylbutanal. Linalool is a type of monoterpene alcohol represented by the molecular formula $C_{10}H_{18}O$, and is known to have an aroma like lily of the valley, lavender, and bergamot. Geraniol is a type of linear monoterpenoid represented by the chemical formula $C_{10}H_{17}OH$. It is known that geraniol is found in essential oils like rose oil, palmarosa oil, and citronella oil, and has a rose-like aroma. 2-Methylbutanal is a type of acyclic aliphatic aldehyde represented by the molecular formula $C_5H_{10}O$. It is known that 2-methylbutanal is naturally occurring in fruits and also found in roasted or cooked peanuts, and that this component has a burnt odor.

In the solid composition of the present invention, the weight ratio of 2-methylbutanal content to total linalool and geraniol content (2-methylbutanal/(linalool geraniol)) is in the range of from 0.015 to 0.215. When 2-methylbutanal is present in combination with linalool and geraniol at a weight ratio within the aforementioned range, the solid composition can exhibit particularly excellent floral aroma.

The weight ratio of 2-methylbutanal content to total linalool and geraniol content in the solid composition of the present invention is preferably not less than 0.02, not less than 0.025, not less than 0.03, not less than 0.035, not less than 0.04, not less than 0.045, or not less than 0.05. Also, the weight ratio of 2-methylbutanal content to total linalool and geraniol content in the solid composition of this invention is preferably not more than 0.21, not more than 0.20, not more than 0.19, not more than 0.18, not more than 0.17, not more than 0.16, not more than 0.15, not more than 0.14, or not more than 0.13. Typically, the weight ratio of 2-methylbutanal content to total linalool and geraniol content in the solid composition of this invention is in the range of preferably from 0.025 to 0.2, more preferably from 0.03 to 0.19, still more preferably from 0.045 to 0.14.

The linalool content in the solid composition of the present invention is not particularly limited, and is for example not less than 0.001 ppm, preferably not less than 0.002 ppm, not less than 0.005 ppm, not less than 0.01 ppm, not less than 0.02 ppm, not less than 0.05 ppm, not less than 0.1 ppm, not less than 1 ppm, or not less than 10 ppm. When the linalool content falls within the aforementioned range, the solid composition can exhibit excellent floral aroma. The upper limit of the linalool content in the solid composition of this invention is not particularly limited. For example, the linalool content is not more than 10000 ppm, preferably not more than 5000 ppm, not more than 4000 ppm, not more than 3000 ppm, not more than 2000 ppm, not more than 1000 ppm, not more than 500 ppm, not more than 200 ppm, or not more than 100 ppm. Thus, the linalool content in the solid composition of this invention is typically in the range of from 0.001 to 10000 ppm, preferably from 0.1 to 5000 ppm, more preferably from 1 to 2000 ppm, still more preferably from 10 ppm to 1000 ppm.

The geraniol content in the solid composition of the present invention is not particularly limited, and is for example not less than 0.01 ppm, preferably not less than 0.02 ppm, not less than 0.05 ppm, not less than 0.1 ppm, not less than 0.2 ppm, not less than 0.5 ppm, or not less than 1 ppm. When the geraniol content falls within the aforementioned range, the solid composition of this invention can exhibit more excellent floral aroma. The upper limit of the geraniol content in the solid composition of this invention is not particularly limited. For example, the geraniol content is not more than 10000 ppm, preferably not more than 5000 ppm, not more than 2000 ppm, not more than 1000 ppm, not more than 500 ppm, not more than 200 ppm, not more than 100 ppm, or not more than 50 ppm. Thus, the geraniol content in the solid composition of this invention is typically in the range of from 0.01 to 10000 ppm, preferably from 0.1 to 2000 ppm, more preferably from 0.5 to 1000 ppm, still more preferably from 1 to 500 ppm.

The content ratio of linalool to geraniol in the solid composition of the present invention is not particularly limited. The content ratio of linalool to geraniol (linalool: geraniol) on a weight basis is in the range of, for example, from 1:50 to 50:1, preferably from 1:10 to 20:1, more preferably from 1:5 to 10:1, still more preferably from 1:1 to 5:1.

The total linalool and geraniol content in the solid composition of the present invention is not particularly limited, and is for example not less than 0.1 ppm, preferably not less than 0.2 ppm, not less than 0.3 ppm, not less than 0.5 ppm, not less than 1 ppm, not less than 5 ppm, or not less than 10 ppm. The upper limit of the total linalool and geraniol content in the solid composition of this invention is not particularly limited. For example, the total linalool and geraniol content is not more than 10000 ppm, preferably not more than 5000 ppm, not more than 3000 ppm, not more than 2000 ppm, not more than 1000 ppm, not more than 500 ppm, or not more than 200 ppm. Thus, the total linalool and geraniol content in the solid composition of this invention is typically in the range of from 0.1 to 10000 ppm, preferably from 1 to 1000 ppm, more preferably from 5 to 500 ppm, still more preferably from 10 to 200 ppm.

The 2-methylbutanal content in the solid composition of the present invention is not particularly limited, and is for example not less than 0.01 ppm, preferably not less than 0.02 ppm, not less than 0.05 ppm, not less than 0.1 ppm, not less than 0.2 ppm, not less than 0.5 ppm, or not less than 1 ppm. When 2-methylbutanal is present in an amount within the aforementioned range in combination with linalool and geraniol, the solid composition of this invention can exhibit more excellent floral aroma. The upper limit of the 2-methylbutanal content in the solid composition of this invention is not particularly limited. For example, the 2-methylbutanal content is not more than 1000 ppm, preferably not more than 500 ppm, not more than 200 ppm, not more than 100 ppm, not more than 50 ppm, not more than 20 ppm, or not more than 10 ppm. Thus, the 2-methylbutanal content in the solid composition of this invention is typically in the range of from 0.01 to 1000 ppm, preferably from 0.2 to 50 ppm, more preferably from 0.5 to 20 ppm, still more preferably from 1 ppm to 10 ppm.

(2,4-Heptadienal)

The solid composition of the present invention can further comprise 2,4-heptadienal. 2,4-Heptadienal is a type of terpene aldehyde represented by the molecular formula $C_7H_{10}O$, and is known to smell like liver or fish.

The 2,4-heptadienal content in the solid composition of the present invention is not particularly limited, and is for example not less than 0.00001 ppm, preferably not less than 0.00002 ppm, not less than 0.00003 ppm, not less than 0.00004 ppm, not less than 0.00005 ppm, not less than 0.00006 ppm, not less than 0.00007 ppm, not less than 0.00008 ppm, not less than 0.00009 ppm, or not less than 0.0001. When 2,4-heptadienal is present in an amount within the aforementioned range in combination with the aroma components mentioned above, the solid composition of this invention can exhibit more excellent floral aroma. The upper limit of the 2,4-heptadienal content in the solid composition of this invention is not particularly limited. For example, the 2,4-heptadienal content is not more than 20 ppm, preferably not more than 10 ppm, not more than 5 ppm, not more than 2 ppm, not more than 1 ppm, not more than 0.5 ppm, or not more than 0.2 ppm. The 2,4-heptadienal content in the solid composition of this invention is typically in the range of from 0 to 20 ppm, preferably from 0 to 1 ppm, more preferably from 0 to 0.5 ppm, still more preferably from 0 to 0.2 ppm.

In the present invention, the contents of linalool, geraniol, 2-methylbutanal, and 2,4-heptadienal in the solid composition can be measured using gas chromatography (GC). As a gas chromatographic analysis system, Flash GC Nose HERACLES II (produced by Alpha M.O.S. Japan K.K.) can be used. To be specific, by using a solution prepared by dissolving the solid composition of this invention in water, the contents of the above aroma components can be measured under the conditions detailed below.

Gas chromatography system: Flash GC Nose HERACLES II

Column 1: MXT-5 (slight polarity, 10 m, 180 μm ID, 0.4 μm)

Column 2: MXT-WAX (high polarity, 10 m, 180 μm ID, 0.4 μm)

Carrier gas flow rate: hydrogen 1.6 mL/min.

Flame ionization detector (FID) temperature: 260° C.

Injector temperature: 200° C.

Oven temperature: 40° C. (5 sec.), then raised at 1.5° C./sec. to 250° C. (90 sec.)

Injection time: 125 sec.

Trap temperature: 50° C. for adsorption, 240° C. for desorption

Trap time: 130 sec. for adsorption, 35 sec. for preheating

The conditions for measurement samples can be set as detailed later in the Examples section. After the contents of aroma components in a solution are measured, the contents of aroma components in the solid composition can be determined by back calculation from the amount of the solid composition dissolved in water.

In the present invention, when aroma components such as linalool and geraniol are present in the form of glucosides, the contents of such aroma components, unless otherwise specified, refer to the contents of those aroma components alone, such as linalool alone or geraniol alone, excluding those of sugar moieties. Removal of glucosidic moieties (sugar moieties) can be performed using an appropriate sugar hydrolase.

(Dextrin)

The solid composition of the present invention can comprise a dextrin. The term "dextrin" is a generic term for carbohydrates produced by the hydrolysis of starch or glycogen. In this invention, the dextrin can be used as an excipient to form a solid composition. The type of a dextrin used in the solid composition of this invention is not particularly limited, and at least one type, at least two types, at least three types, or at least four types of dextrins can be used, with preferably at least two types, more preferably at least three types, of dextrins being used.

The dextrin content in the solid composition of the present invention is not particularly limited, and the total dextrin content is in the range of, for example, from 10 to 70 wt. %, preferably from 20 to 65 wt. %, more preferably from 30 to 60 wt. %. In this invention, a commercially available dextrin product can be used. The dextrin content in the solid composition can be measured by sugar analysis using a method known to skilled artisans.

The type of a dextrin used in the present invention is not particularly limited, and examples thereof include, but are not limited, a linear dextrin, a cyclic dextrin, and a spiral dextrin. As referred to herein, the term "linear dextrin" refers to a dextrin that is composed of glucoses linked in a straight chain form or in the form of chains with branches and which does not form a ring structure or a spiral structure. Also, as referred to herein, the term "cyclic dextrin" refers to a dextrin that is composed of glucoses linked to form a cyclic structure and which does not form a spiral structure. As referred to herein, the term "spiral dextrin" refers to a dextrin composed of glucoses linked to form a spiral structure. The solid composition of this invention preferably comprises a linear dextrin and a cyclic dextrin.

The type of the linear dextrin is not particularly limited, and examples thereof that can be used include linear dextrins with a DE (dextrose equivalent) of from 1 to 25, and linear dextrins with a weight average molecular weight of from 500 to 160,000. In the present invention, one type of linear dextrin may be used alone, or two or more types thereof may be used in combination. In a preferred embodiment of this invention, two types of linear dextrins are used. For example, in the case of using two types of linear dextrins, a combination of a linear dextrin with a DE of from 2 to 5 and a linear dextrin with a DE of from 16 to 20, or a combination of a linear dextrin with a weight average molecular weight of from 90,000 to 140,000 and a linear dextrin with a weight average molecular weight of from 600 to 1,200, can be used.

In the case of using a linear dextrin(s), the content of the linear dextrin(s) in the solid composition of the present invention is in the range of, for example, from 0 to 65 wt. %, preferably from 10 to 60 wt. %, more preferably from 15 to 55 wt. %. When the two types of linear dextrins to be used are a linear dextrin with a DE of from 2 to 5 and a linear dextrin with a DE of from 16 to 20, the content of the linear dextrin with a DE of from 2 to 5 in the solid composition of this invention is in the range of, for example, from 0 to 60 wt. %, preferably from 5 to 50 wt. %, more preferably from 10 to 45 wt. %, and the content of the linear dextrin with a DE of from 16 to 20 in the solid composition of this invention is in the range of, for example, from 0 to 60 wt. %, preferably from 5 to 50 wt. %, more preferably from 10 to 45 wt. %. The ratio (weight ratio) of the content of the linear dextrin with a DE of from 2 to 5 to that of the linear dextrin with a DE of from 16 to 20 is in the range of, for example, from 4:0.5 to 0.5:5, preferably from 3:1 to 1:5, more preferably from 2:1 to 1:4.

When the two types of linear dextrins to be used are a linear dextrin with a weight average molecular weight of from 90,000 to 140,000 and a linear dextrin with a weight average molecular weight of from 600 to 1,200, the content of the linear dextrin with a weight average molecular weight of from 90,000 to 140,000 in the solid composition of the present invention is in the range of, for example, from 0 to 65 wt. %, preferably from 10 to 60 wt. %, more preferably from 15 to 55 wt. %, and the content of the linear dextrin with a weight average molecular weight of from 600 to 1,200 is in the range of, for example, from 5 to 60 wt. %, preferably from 5 to 50 wt. %, more preferably from 10 to 45 wt. %. The ratio (weight ratio) of the content of the linear dextrin with a weight average molecular weight of from 90,000 to 140,000 to that of the linear dextrin with a weight average molecular weight of from 600 to 1,200 is in the range of, for example, from 5:1 to 1:3, preferably from 3:1 to 1:2, more preferably from 2:1 to 1:1.

Examples of the cyclic dextrin that can be used include cyclodextrins. In the present invention, α-cyclodextrin, β-cyclodextrin, and γ-cyclodextrin can all be used, with α-cyclodextrin being preferably used. The weight average molecular weight of the cyclic dextrin used in this invention is not particularly limited, and is in the range of, for example, from 700 to 1,300, preferably from 800 to 1,200, more preferably from 900 to 1,100. In the case of using a cyclic dextrin, the content of the cyclic dextrin in the solid composition of this invention is in the range of, for example, from 0.5 to 15 wt. %, preferably from 1 to 12 wt. %, more preferably from 3 to 10 wt. %.

In the case of using a linear dextrin and a cyclic dextrin in combination, the ratio (weight ratio) of the content of the linear dextrin to that of the cyclic dextrin is in the range of, for example, from 20:1 to 2:1, preferably from 15:1 to 3:1, more preferably from 12:1 to 5:1.

The solid composition of the present invention may comprise a spiral dextrin. The DE value of the spiral dextrin used in this invention is not particularly limited and is, for example, less than 7, preferably less than 6, more preferably less than 5. Examples of the spiral dextrin that can be used include Cluster Dextrin (produced by Ezaki Glico Co., Ltd.). In the case of using a spiral dextrin, the content of the spiral dextrin in the solid composition of the present invention is in the range of, for example, from 0 to 45 wt. %, preferably from 5 to 30 wt. %, more preferably from 10 to 20 wt. %. Further, in the case of using a spiral dextrin, the ratio (weight ratio) of the content of a linear dextrin to that of a spiral dextrin is in the range of, for example, from 1:3 to 3:1, preferably from 1:2 to 2:1, more preferably from 1:1.5 to 1.5:1.

(Other Aroma Components)

The solid composition of the present invention can further comprise, in addition to linalool, geraniol, 2-methylbutanal, and 2,4-heptadienal as mentioned above, at least one aroma component selected from the group consisting of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole. When such aroma components are incorporated in the solid composition of this invention, the solid composition can exhibit still more excellent floral aroma.

The (z)-3-hexenol content in the solid composition of the present invention is in the range of, for example, from 0.1 to 50 ppm, preferably from 0.5 to 20 ppm, more preferably from 1 to 10 ppm. The 1-penten-3-ol content in the solid composition of this invention is in the range of, for example, from 0.1 to 50 ppm, preferably from 0.5 to 20 ppm, more preferably from 1 to 10 ppm. The nerolidol content in the solid composition of this invention is in the range of, for example, from 0.01 to 20 ppm, preferably from 0.05 to 10 ppm, more preferably from 0.1 to 5 ppm. The hexanal content in the solid composition of this invention is in the range of, for example, from 0.01 to 20 ppm, preferably from 0.05 to 10 ppm, more preferably from 0.1 to 5 ppm. The (E)-linalool oxide content in the solid composition of this invention is in the range of, for example, from 0.1 to 1000 ppm, preferably from 1 to 100 ppm, more preferably from 5 to 50 ppm. The benzyl alcohol content in the solid composition of this invention is in the range of, for example, from 0.1 to 100 ppm, preferably from 0.5 to 10 ppm, more preferably from 1 to 5 ppm. The β-myrcene content in the solid composition of this invention is in the range of, for example, from 0.01 to 1000 ppm. The trans-β-ocimene content in the solid composition of this invention is in the range of, for example, from 0.01 to 1000 ppm. The L-α-terpineol content in the solid composition of this invention is in the range of, for example, from 0.01 to 1000 ppm. The methyl salicylate content in the solid composition of this invention is in the range of, for example, from 0.01 to 1000 ppm. The indole content in the solid composition of this invention is in the range of, for example, from 0.01 to 1000 ppm.

In the present invention, the contents of α-ionone, β-cyclocitral, (z)-3-hexenol, 1-penten-3-ol, nerolidol, hexanal, (E)-linalool oxide, β-myrcene, trans-β-ocimene, L-α-terpineol, methyl salicylate, benzyl alcohol, and indole in the solid composition can be measured using gas chromatography/mass spectroscopy (GC/MS). To be specific, the contents of the above aroma components can be measured under the conditions detailed below.

System:
GC: GC7890B, produced by Agilent Technologies
MS: 5977A, produced by Agilent Technologies
HS: MPS, produced by Gestel
Tube: Tenax TA, Carbon bx1000
Column: HP-INNOWAX, 60 m×0.25 mm i.d., df=0.25 μm
Temperature conditions: 40° C. (4 min.), then raised at 5° C./min. to 260° C.
Carrier gas flow rate: He 1.5 mL/min.
Injection method: Splitless
Ion source temperature: 260° C.

The conditions for measurement samples can be set as detailed later in the Examples section.

(Extract Containing Linalool, Geraniol and 2-methylbutanal)

In the solid composition of the present invention, linalool, geraniol and 2-methylbutanal may be used as respective purified products or respective crude purified products, or may be used in the form of an extract containing linalool, geraniol and 2-methylbutanal. As the extract containing linalool, geraniol and 2-methylbutanal, a naturally occurring extract can be used, and a vegetable extract or an animal extract can be used. In this invention, a vegetable extract is preferably used, and in particular, a tea leaf extract is more preferably used. Although the type of the extract containing linalool, geraniol and 2-methylbutanal is not particularly limited, the extract is preferably of a different type from the tea leaf extract described above. In other words, when the aforementioned tea leaf extract is regarded as a first tea leaf extract, the tea leaf extract containing linalool, geraniol and 2-methylbutanal can be used as a second tea leaf extract different from the first tea leaf extract. Also, the second tea leaf extract may further contain 2,4-heptadienal. Additionally, in this invention, linalool, geraniol and 2-methylbutanal may be derived from the first tea leaf extract. In this invention, the contents of linalool, geraniol and 2-methylbutanal, regardless of their origin, mean the amounts of these components contained in the solid composition of this invention.

The tea leaves used as a source material to make a tea leaf extract containing linalool, geraniol and 2-methylbutanal are preferably non-fermented tea leaves, and specific examples thereof include green tea leaves, such as Aracha, Sencha, Gyokuro, Kabuse-cha, Kukicha, Karigane (stems of Gyokuro and high-grade Sencha), Tenbone (roasted Tencha stems), Tencha, Bancha, and Houji-cha. The tea leaf extract containing linalool, geraniol and 2-methylbutanal may be an extract from a single type of tea leaves or may be an extract from a blend of two or more types of tea leaves. In this invention, the tea leaf extract containing linalool, geraniol and 2-methylbutanal is preferably a green tea leaf extract, more preferably an extract from stems of Kukicha, Karigane, Tenbone, or the like. By using stems of Kukicha, Karigane, Tenbone, or the like, not only linalool, geraniol and 2-methylbutanal, but also other aroma components derived from such stems can be contained in the tea leaf extract, which can impart more excellent aroma characteristic of high-grade green tea to the solid composition.

In the case of using a tea leaf extract containing linalool, geraniol and 2-methylbutanal, the content of the tea leaf extract is not particularly limited, and can be adjusted such that the contents of linalool, geraniol and 2-methylbutanal in the solid composition of the present invention fall within the aforementioned ranges.

(Other Additives)

The solid composition of the present invention not only comprises the aforementioned components, but also can have added thereto other additives commonly used in beverages and foods, such as antioxidant, preservative, pH adjustor, sweetener, enrichment, thickening stabilizer, emulsifier, dietary fiber, and quality stabilizer, to the extent that such additives do not impair the effects of this invention.

(Solid Composition)

The form of the solid composition of the present invention is not particularly limited, and the solid composition of this invention is preferably in a powder form, or namely a powder composition. In this invention, the powder composition has only to be in the form of powder, including granules. In this invention, the particle size of the powder composition is not particularly limited, and is in the range of, for example, from 0.1 to 500 μm, preferably from 1 to 300 μm, more preferably from 10 to 200 μm.

The solid composition of the present invention can be incorporated in a beverage or food. In other words, this invention can provide a beverage or food comprising the aforementioned solid composition. The solid composition of this invention is preferably incorporated in a liquid to prepare a beverage, and most preferably consumed in the form of a tea beverage prepared by dissolving the solid composition in water, hot water or the like. From this viewpoint, the solid composition of this invention can be provided as an instant tea. As referred to herein, the term "instant tea" refers to a powder beverage prepared by drying and powdering a solution of a liquid tea leaf extract used as a source material. Examples of tea beverages include non-fermented teas (e.g., green tea), semi-fermented teas (e.g., oolong tea), and fermented teas (e.g., black tea). Specific examples thereof include: steamed, non-fermented teas (green teas), such as Sencha, Bancha, Houji-cha, Gyokuro, Kabuse-cha, and Tencha; non-fermented teas including Kamairi-cha such as Ureshinocha, Aoyagicha, and different Chinese teas; semi-fermented teas such as Hoshucha, Tekkanon tea, and oolong tea; and fermented teas such as black tea, Awa-bancha, and puerh tea. The tea beverage in which the solid composition of this invention is used is preferably a green tea. In other words, the solid composition of this invention can be provided as an instant green tea.

When the solid composition of the present invention is incorporated in a liquid such as water or hot water, the content of the solid composition in a solution is not particularly limited, and is in the range of, for example, from 0.01 to 20 wt. %, preferably from 0.05 to 10 wt. %, more preferably from 0.1 to 5.0 wt. %. Also, the content of the solid composition in a solution may be adjusted so as to ensure, for example, that the linalool content in the solution falls within the range of from 1 to 1000 ppb (w/w), preferably from 3 to 500 ppb (w/w), more preferably from 5 to 300 ppb (w/w), still more preferably from 10 to 200 ppb (w/w), or that the geraniol content in the solution falls within the range of from 1 to 800 ppb (w/w), preferably from 3 to 400 ppb (w/w), more preferably from 5 to 200 ppb (w/w), still more preferably from 10 to 100 ppb (w/w), or that the 2-methylbutanal content in the solution falls within the range of from 0.1 to 500 ppb (w/w), preferably from 0.3 to 300 ppb (w/w), more preferably from 0.3 to 100 ppb (w/w), still more preferably from 1 to 50 ppb (w/w).

Further, the content of the solid composition in a solution may be adjusted so as to ensure that the total linalool and geraniol content in the solution falls within the range of from 1 to 1000 ppb (w/w), preferably from 5 to 800 ppb (w/w), more preferably from 10 to 600 ppb (w/w), still more preferably from 20 to 400 ppb (w/w). When the solid composition contains 2,4-heptadienal, the content of the solid composition in a solution may be adjusted so as to ensure that the 2,4-heptadienal content in the solution falls within the range of from 0.001 to 100 ppb (w/w), preferably from 0.01 to 50 ppb (w/w), more preferably from 0.05 to 30 ppb (w/w), still more preferably from 0.1 to 20 ppb (w/w).

The solid composition of the present invention can also be added to a food. Examples of foods include confectionary foods, such as cakes, sponge cakes, candies, cookies, jellies, puddings, and chocolates, frozen desserts such as ice cream, ice candy, and sherbet; and snacks, regardless of whether they are Japanese or Western confectionaries. Also, the solid composition of this invention can be used in breads or dairy products. When the solid composition of the present invention is added to a food, the amount of the solid composition added can be determined, as appropriate, depending on, for example, the type of the food.

When the solid composition of the present invention is added to a food, the amount of the solid composition added can be determined, as appropriate, depending on, for example, the type of the food. The solid composition of this invention can be added to a food so as to ensure that the content of the solid composition in the food falls within the range of, for example, from 0.01 to 20 wt. %, preferably from 0.05 to 10 wt. %, more preferably from 0.1 to 5 wt. %.

Also, the amount of the solid composition of the present invention added to a food can be determined using the content(s) of the aforementioned aroma component(s) as an index. For example, the solid composition of this invention can be added to a food so as to ensure that the linalool content in the food falls within the range of from 1 to 1000 ppb (w/w), preferably from 3 to 500 ppb (w/w), more preferably from 5 to 300 ppb (w/w), still more preferably from 10 to 200 ppb (w/w). For example, the solid composition of this invention can be added to a food so as to ensure that the geraniol content in the food falls within the range of from 1 to 800 ppb (w/w), preferably from 3 to 400 ppb (w/w), more preferably from 5 to 200 ppb (w/w), still more preferably from 10 to 100 ppb (w/w). For example, the solid composition of this invention can be added to a food so as to ensure that the 2-methylbutanal content in the food falls within the range of from 0.1 to 500 ppb (w/w), preferably from 0.3 to 300 ppb (w/w), more preferably 0.3 to 100 ppb (w/w), still more preferably from 1 to 50 ppb (w/w).

Also, the solid composition of this invention can be added to a food so as to ensure that the total linalool and geraniol content in the food falls within the range of from 1 to 1000 ppb (why), preferably from 5 to 800 ppb (why), more preferably from 10 to 600 ppb (w/w), still more preferably from 20 to 400 ppb (w/w). When the solid composition contains 2,4-heptadienal, the solid composition of this invention can be added to a food so as to ensure that the 2,4-heptadienal content in the food falls within the range of from 0.001 to 100 ppb (w/w), preferably from 0.01 to 50 ppb (w/w), more preferably from 0.05 to 30 ppb (w/w), still more preferably from 0.1 to 20 ppb (why).

(Production Method)

The solid composition of the present invention can be produced through the steps of (A) preparing a solution comprising a tea leaf extract, linalool, geraniol and 2-methylbutanal, and having a weight ratio of 2-methylbutanal content to total linalool and geraniol content of from 0.015 to 0.215, and (B) drying the prepared solution. Said solution not only comprises a tea leaf extract, linalool, geraniol and 2-methylbutanal, but also may contain a dextrin and/or other additives as mentioned above. The amounts of any of these components to be added can be determined, as appropriate, to the extent that such components do not impair the effects of this invention. The order of adding such components is not particularly limited. As a solvent for preparing the solution, water may be used or a liquid tea leaf extract may be used as it is.

The solution can be dried using a method conventionally known to skilled artisans. Examples of drying methods include spray-drying, freeze drying, hot-air drying, and vacuum drying, with spray-drying being preferably used in the present invention. The conditions for spray-drying, such as drying temperature and time, are not particularly limited, and can be adjusted as appropriate.

The process of producing the solid composition of the present invention not only comprises the aforementioned steps, but also may comprise a step of concentrating the solution obtained at step (A), a step of sterilizing the solution obtained at step (A), and/or the like. All of these additional steps can be performed using a method conventionally known to skilled artisans.

With regard to linalool, geraniol and 2-methylbutanal as used at step (A), a tea leaf extract (second tea leaf extract) containing these components may be used as mentioned above. Said second tea leaf extract may further contain 2,4-heptadienal. By mixing a first tea leaf extract with the second tea leaf extract, the solution at step (A) can be prepared. The tea leaf extract (second tea leaf extract) containing linalool, geraniol and 2-methylbutanal can be prepared through taking a step of distilling tea leaves, although the step taken to prepare the second tea leaf extract is not particularly limited to the above one. The tea leaves used as a source material to make the second tea leaf extract are as described above. In this invention, stems of Kukicha, Karigane, Tenbone, or the like can be preferably used as a source material.

Distillation of tea leaves to make a tea leaf extract (second tea leaf extract) containing linalool, geraniol and 2-methylbutanal is typically performed using a steam distillation method. Steam distillation is a method in which steam is passed through a source material (tea leaves) and aroma components distilled out together with steam are aggregated by cooling. Exemplary modes of steam distillation that can be adopted include atmospheric steam distillation, vacuum steam distillation, and gas-liquid multistage countercurrent contact distillation (spinning cone column). In this invention, atmospheric steam distillation is preferably used. Steam distillation of tea leaves is typically performed by a decoction type steam distillation method. The decoction type steam distillation is a method in which a source material (tea leaves) is heated in a state soaked in water and the generated steam is collected and cooled to obtain a distillate.

The tea leaf extract (second tea leaf extract) containing linalool, geraniol and 2-methylbutanal as obtained by a steam distillation method can be further subjected to a concentration step to enhance the concentrations of aroma components. Concentration of the second tea leaf extract is typically performed by a distillative concentration method. The distillative concentration can be performed by, for example, employing a procedure in which the tea leaf extract is placed in a still and boiled by heating from the bottom to collect aroma components distilled out together with steam. For the distillative concentration, an atmospheric distillative concentration method or a vacuum distillative concentration method can be employed. In this invention, the vacuum distillative concentration method is preferably employed. Also, an operation called salting-out may be performed at the step of distillative concentration. By performing the salting-out treatment, water molecules can be attracted by the polarity of a salt in a distillate placed in a still, thereby promoting the vaporization of organic compounds. The salting-out treatment can be performed by incorporating a salt such as sodium chloride into a distillate to be concentrated.

The tea leaf extract (second tea leaf extract) containing linalool, geraniol and 2-methylbutanal may be produced by taking a further step of treatment with activated carbon. By performing activated carbon treatment, the amounts of unwanted aroma components can be reduced. As referred to herein, the term "activated carbon" refers to a porous, carbon-based substance produced through activation of carbon-containing materials such as wood at high temperatures.

(Method for Enhancing the Floral Aroma of a Beverage or Food)

The solid composition of the present invention as obtained in the aforementioned manner can be added to a beverage or food, so that the floral aroma of the beverage or food can be enhanced. For this reason, in another embodiment, this invention can be directed to a method for enhancing the floral aroma of a beverage or food, the method comprising a step of adding the solid composition obtained through the aforementioned steps to the beverage or food.

EXAMPLES

Hereunder, the present invention will be described by way of working examples, but this invention is not limited to these examples.

1. Preparation of Solid Compositions (Powder Compositions)

(1-1) Liquid Tea Leaf Extract

A tea extraction tank was charged with 30 kg of commercial Tencha stems (Tenbone), 4 kg of a spiral dextrin (Cluster Dextrin; produced by Ezaki Glico Co., Ltd.; weight average molecular weight: 400,000; DE: <5), 0.9 kg of L-ascorbic acid, and 0.54 kg of sodium bicarbonate, and further with 300 L of hot water, and the mixture was held at 50° C. for 120 minutes to prepare a liquid tea leaf extract. 196 L of the obtained liquid tea leaf extract was mixed with 1.78 kg of a linear dextrin (Pine Oligo; produced by Matsutani Chemical Industry Co., Ltd.; weight average molecular weight: 710), and the mixture was centrifuged to remove insolubles (tea leaves) and sterilized under the conditions of 90° C. for 30 seconds. Then, the mixture was subjected to membrane concentration (NTR-759HG-S4F; produced by Nitto Denko Corporation; liquid temperature: 20° C.; pressure: 3 MPa) so as to obtain a concentrated liquid tea leaf extract having a solids concentration in solution of Brix 20 to 35.

(1-2) Tea Leaf Distillate

Separately from the aforementioned process, a distillate was prepared from tea leaves. To be specific, 15 kg of commercial Kukicha tea leaves were weighed out and mixed with 100 kg of water, and the mixture was held at 50° C. for 2 hours to effect heat treatment of the tea leaves. Next, the treated solution containing the tea leaves was placed in a steam still, and decoction type steam distillation was performed at a steam pressure of 0.25 MPa, a steam flow rate of 20 kg/hr, and a steam temperature of 100° C. (atmospheric pressure). Then, condensation was carried out at cooling refrigerant temperatures of 4° C. for supply and 6° C. for return, and at a refrigerant flow rate of 30 L/min., to collect a distillate. The time of distillate collection was set to 30 minutes after the distillate started to distill out. The amount of the distillate collected was 8 kg. This operation was repeated ten times to obtain a total of 80 kg of distillate (tea aroma composition).

The obtained tea aroma composition was treated with activated carbon. To be specific, 8 g of wood-derived powder activated carbon (Shirasagi WP-Z; produced by Osaka Gas Chemicals Co., Ltd.) with an average pore diameter of 3 nm was added to 80 kg of the above-obtained distillate, and the mixture was stirred with a stirrer for 10 minutes. Then, the activated carbon was removed from the distillate using a filter paper (ADVANTEC, No. 2). The treatment temperature used during the activated carbon treatment was set to 6° C.

Further, 80 kg of the tea aroma composition treated with activated carbon was placed in a still in two divided doses each of 40 kg, and the interior of the still was depressurized to −0.09 MPa using a vacuum pump. The depressurized still was heated at a steam flow rate of from 5 to 15 kg/hr and a steam pressure of 0.25 MPa to raise the temperature of the distillate to 40 to 50° C. Then, condensation was carried out at cooling refrigerant temperatures of 4° C. for supply and 6° C. for return, and at a refrigerant flow rate of 31 L/min., to collect a distillate. The time of distillate collection was set to 15 minutes after the distillate started to distill out. The amount of the distillate collected was 4 kg in total (concentrated to 20-fold). The thus-obtained distillate was used as a tea leaf distillate.

(1-3) Powder Composition

Twenty liters of the liquid tea leaf extract obtained in (1-1) was mixed with 1780 mL of the tea leaf distillate obtained in (1-2), and then the mixed solution was sterilized under the conditions of 90° C. for 45 seconds. The sterilized solution was spray-dried using a spray dryer to prepare a powder composition. The drying conditions adopted were an inlet hot-air temperature of 160° C. and an outlet hot-air temperature of 110° C.

(1-4) Evaluation of Powder Compositions

The above obtained powder composition was dissolved in water and felt to have excellent floral aroma. As a result of analyzing this powder composition, different aroma components were detected, such as linalool, geraniol, 2-methylbutanal, nerolidol, hexanal, 1-penten-3-ol, and (z)-3-hexenol. With the presence of linalool, geraniol, and 2-methylbutanal being particularly focused among those aroma components, the concentrations of these three components in this powder composition were measured by following the procedure described below.

<Calibration Curve>

Standard stock solutions (in ethanol solvent) were prepared so as to ensure that each of the aroma components of interest was present at a concentration of 1000 ppm. Each stock solution was diluted with pure water to concentrations of 0.004, 0.02, 0.05, 0.1, 0.2, and 0.5 ppm. 10 mL each of the prepared solutions was transferred into a 20 mL glass vial containing 3 g of sodium chloride, and the thus obtained samples were used for calibration curve plotting.

<Preparation of an Analysis Sample>

The tea aroma composition was diluted with pure water, as appropriate, to a concentration that fell within the concentration range of the calibration curve, and 10 mL of the diluted solution and 3 g of sodium chloride were placed in a 20 mL glass vial to thereby prepare an analysis sample.

<Component Analysis>

The concentrations of the different aroma components were measured using a gas chromatographic analysis system (Flash GC Nose HERACLES II; produced by Alpha M.O.S. Japan K.K.).

(Sampling Parameters)

Incubation: 60° C. for 15 min.

Syringe: temperature: 70° C.; cleaning after injection: 90 sec.

Headspace injection: 5000 μL at 250 μL/sec.

(System parameters)

Column 1: MXT-5 (slight polarity, 10 m, 180 μm ID, 0.4 μm)

Column 2: MXT-WAX (high polarity, 10 m, 180 μm ID, 0.4 μm)

Carrier gas flow rate: hydrogen 1.6 mL/min.

Flame ionization detector (FID) temperature: 260° C.

Injector temperature: 200° C.

Oven temperature: 40° C. (5 sec.), then raised at 1.5° C./sec. to 250° C. (90 sec.)

Injection time: 125 sec.

Trap temperature: 50° C. for adsorption, 240° C. for desorption

Trap time: 130 sec. for adsorption, 35 sec. for preheating

As a result of the above measurement, the concentrations of linalool, geraniol and 2-methylbutanal were found to be 260 ppb, 73 ppb and 50 ppb, respectively. Additionally, a different powder composition was prepared using commercial Sencha tea leaves as a source material to make a liquid tea leaf extract, and was evaluated by the same procedures as mentioned above. As a result, the different powder composition was felt to have a similar excellent floral aroma, and the concentrations of linalool, geraniol and 2-methylbutanal in said powder composition were found to be 1853 ppb, 814 ppb and 102 ppb, respectively (powder composition B).

The concentrations of other aroma components were measured under the conditions detailed below.

<Component Analysis>

An analysis sample prepared by the same procedure as mentioned above was loaded into a gas chromatography/mass spectroscopy system (produced by Agilent Technologies) to measure the concentrations of different aroma components by a multi-volatile method (MVM) using a MPS produced by Gestel.

System:
GC: GC7890B, produced by Agilent Technologies
MS: 5977A, produced by Agilent Technologies
HS: MIPS, produced by Gestel
Tube: Tenax TA, Carbon bx1000
Column: HP-INNOWAX, 60 m×0.25 mm i.d., df=0.25 μm
Temperature conditions: 40° C. (4 min.), then raised at 5° C./min. to 260° C.
Carrier gas flow rate: He 1.5 mL/min.
Injection method: Splitless
Ion source temperature: 260° C.

As a result of the above measurement, the concentrations of nerolidol, hexanal, 1-penten-3-ol, and (z)-3-hexenol in the powder composition prepared in (1-3) were found to be 2.3 ppb, 6.2 ppb, 29.6 ppb, and 9.5 ppb, respectively. Also, the concentrations of nerolidol, hexanal, 1-penten-3-ol, and (z)-3-hexenol in the powder composition B were found to be 16.2 ppb, 1.9 ppb, 45.7 ppb, and 43.5 ppb, respectively.

2. Study on the Ratio of Aroma Components

Based on the measurement results given above, a focus was placed on linalool, geraniol, and 2-methylbutanal, and in particular, a study was made on the presence and relative ratio of 2-methylbutanal. First, for the purpose of preliminary experiments, a water dilution of the tea leaf distillate prepared in (1-2) was compared with mixed solutions prepared by adding the different aroma component reference standards to water to give the same concentrations of aroma components as those found in the above dilution, and as a result, it was confirmed that there was little difference between the water dilution and the mixed solutions in terms of perceived floral aroma. Further, different mixed solutions prepared by adding varied concentrations of linalool and geraniol reference standards to water were investigated for their aroma, and the results found that there was no significant difference in perceived aroma among all of the mixed solutions prepared with different concentration ratios, and that little difference in aroma was observed at least within the range of linalool/geraniol concentration ratio (linalool:geraniol) of from 1:10 to 20:1.

After the prior confirmation was done as mentioned above, a base powdered tea was first prepared. To be specific, a tea extraction tank was charged with 12 kg of commercial Sencha tea leaves (Yutakamidori) and then with 120 kg of hot water, and the mixture was held at 40° C. for 40 minutes to effect extraction of the tea leaves. This extraction treatment was repeated twice to obtain a total of 181 L of liquid tea leaf extract. The obtained liquid tea leaf extract was mixed with 2.03 kg of a dextrin (Pine Oligo 20), 0.18 kg of L-ascorbic acid, and 0.13 kg of sodium bicarbonate, and then, the mixture was subjected to membrane concentration (NTR-759HG-S4F; produced by Nitto Denko Corporation; liquid temperature: 15° C.; pressure: 3 MPa) to give a Brix value of 30. After the concentration, Cluster Dextrin was added to a concentration of 2.29 wt. %. Finally, the mixed solution was sterilized under the conditions of 90° C. and 30 seconds to prepare a liquid tea leaf extract. The obtained liquid tea leaf extract was spray-dried to give a base powdered tea (powder).

Next, 1.2 g of the above obtained powdered tea was added to 200 mL of water to prepare a powdered tea solution with a Brix value of 0.6 (a tea solids Brix value of 0.3). To the powdered tea solution, linalool, geraniol, and 2-methylbutanal reference standards were added to give such final concentrations as indicated in the table given below, whereby different concentrations of samples were prepared. Since the aroma component concentrations in the different reference standards were unknown, concentration measurements of the reference standards had been done by gas chromatography in advance. To be specific, since 2-methylbutanal was slightly soluble in water, the 2-methylbutanal reference standard acquired was dissolved in 3 to 100 times its weight of ethanol, and the obtained ethanol solutions were further diluted with 50 to 5000 times their weights of water, whereby samples for concentration measurement were prepared. The linalool, geraniol, and 2,4-heptadienal reference standards were diluted with 50 to 5000 times their weights of pure water to adjust their concentrations, as appropriate, to lie within the ranges of the calibration curves, whereby samples for concentration measurement were prepared. The gas chromatographic analysis was done by following the same procedure as mentioned above.

The different samples prepared using the reference standards were subjected to sensory evaluation by four panelists who were well trained in aroma evaluation. In this sensory evaluation, the extent of floral aroma felt from the samples was rated on a five-point scale (with half-point increments), and the ratings provided were averaged. In this evaluation, the different samples were rated on the basis of the rating for the control sample (sample 1-1) which was prepared without addition of 2-methylbutanal and was rated 3 points.

1: No floral aroma is felt.
2: Slight floral aroma is felt
3: Floral aroma is felt
4: Strong floral aroma is felt (excellent in floral aroma)
5: Very strong floral aroma is felt (extremely excellent in floral aroma)

TABLE 1

|  | a Linalool | | b Geraniol | | c 2-Methylbutanal | | | |
| --- | --- | --- | --- | --- | --- | --- | --- | --- |
|  | Amount of standard added (µL) | Concentration (ppb) | Amount of standard added (µL) | Concentration (ppb) | Amount of standard added (µL) | Concentration (ppb) | c/(a + b) | Rating |
| Sample 1-1 | 18 | 200 | 12.5 | 60 | 0 | 3.2 | 0.012 | 3.0 |
| Sample 1-2 | 18 | 200 | 12.5 | 60 | 1.1 | 5.0 | 0.019 | 3.2 |
| Sample 1-3 | 18 | 200 | 12.5 | 60 | 2.3 | 7.0 | 0.027 | 3.4 |
| Sample 1-4 | 18 | 200 | 12.5 | 60 | 4.5 | 10.7 | 0.041 | 3.7 |
| Sample 1-5 | 18 | 200 | 12.5 | 60 | 9 | 18.2 | 0.070 | 4.1 |
| Sample 1-6 | 18 | 200 | 12.5 | 60 | 11.5 | 22.4 | 0.086 | 4.2 |
| Sample 1-7 | 18 | 200 | 12.5 | 60 | 19.5 | 35.7 | 0.137 | 3.8 |
| Sample 1-8 | 18 | 200 | 12.5 | 60 | 32 | 56.5 | 0.217 | 3.0 |
| Sample 1-9 | 18 | 200 | 12.5 | 60 | 55 | 94.9 | 0.365 | 2.5 |

Also, 1.2 g of the above-prepared (base) powdered tea was mixed with 0.8 g of a dextrin mixture (comprising 28.3 wt. parts of Sandek #30, 5 wt. parts of CAVAMAX W6, and 16.7 wt. parts of TK-16) to prepare a powder composition with an increased dextrin content. To the powder composition, 200 mL of water was added to prepare a powdered tea solution with a Brix value of 1.0 (a tea solids Brix of 0.3).

To the obtained powdered tea solution, linalool, geraniol, and 2-methylbutanal reference standards were added to give such final concentrations as indicated in the table given below, whereby different concentrations of samples were prepared. The prepared different samples were subjected to sensory evaluation by following the same procedure as described above. In this evaluation, the different samples were rated on the basis of the rating for sample 2-1 (control) which was prepared without addition of 2-methylbutanal and was rated 3 points.

TABLE 2

|  | a Linalool | | b Geraniol | | c 2-Methylbutanal | | | |
| --- | --- | --- | --- | --- | --- | --- | --- | --- |
|  | Amount of standard added (µL) | Concentration (ppb) | Amount of standard added (µL) | Concentration (ppb) | Amount of standard added (µL) | Concentration (ppb) | c/(a + b) | Rating |
| Sample 2-1 | 18 | 200 | 12.5 | 60 | 0 | 3.2 | 0.012 | 3.0 |
| Sample 2-2 | 18 | 200 | 12.5 | 60 | 19.5 | 35.7 | 0.137 | 4.0 |
| Sample 2-3 | 18 | 200 | 12.5 | 60 | 21.3 | 38.7 | 0.149 | 3.8 |
| Sample 2-4 | 18 | 200 | 12.5 | 60 | 23.5 | 42.4 | 0.163 | 3.8 |
| Sample 2-5 | 18 | 200 | 12.5 | 60 | 27.5 | 49.0 | 0.188 | 3.5 |
| Sample 2-6 | 18 | 200 | 12.5 | 60 | 31.3 | 55.4 | 0.213 | 3.1 |

As shown in the above table, it was found that when 2-methylbutanal was contained in samples, the samples were felt to have more excellent floral aroma, and that when the weight ratio of 2-methylbutanal content to total linalool and geraniol content (2-methylbutanal/(linalool+geraniol)) fell within the specified range, the extent of excellent floral aroma was further enhanced.

The invention claimed is:

1. A solid composition comprising linalool, geraniol, and 2-methylbutanal, and having a weight ratio of 2-methylbutanal content to total linalool and geraniol content of from 0.015 to 0.215, wherein the solid composition comprises a green tea leaf extract derived from at least one green tea leaf selected from the group consisting of Sencha, Gyokuro, Kabuse-cha, and Tencha.

2. The composition according to claim 1, wherein the composition is a powder composition.

3. The composition according to claim 1, comprising two or more types of dextrins.

4. The composition according to claim 3, comprising a linear dextrin and a cyclic dextrin.

5. The composition according to claim 1, further comprising at least one aroma component selected from the group consisting of α-ionone, ≈-cyclocitral, (z)-3-hexenol, 1-penten-3-ol, nerolidol, hexanal, (E)-linalool oxide, Æ-myrcene, trans-Æ-ocimene, L-α-terpineol, methyl salicylate, benzyl alcohol, and indole.

6. A beverage or food comprising the composition according to claim 1.

7. The beverage or food according to claim 6, wherein the beverage or food is a beverage.

8. The beverage or food according to claim 7, wherein the beverage or food is a tea beverage.

* * * * *